Nov. 3, 1936.  J. L. HURST  2,059,355
ANIMAL TRAP
Filed April 15, 1936   2 Sheets-Sheet 2
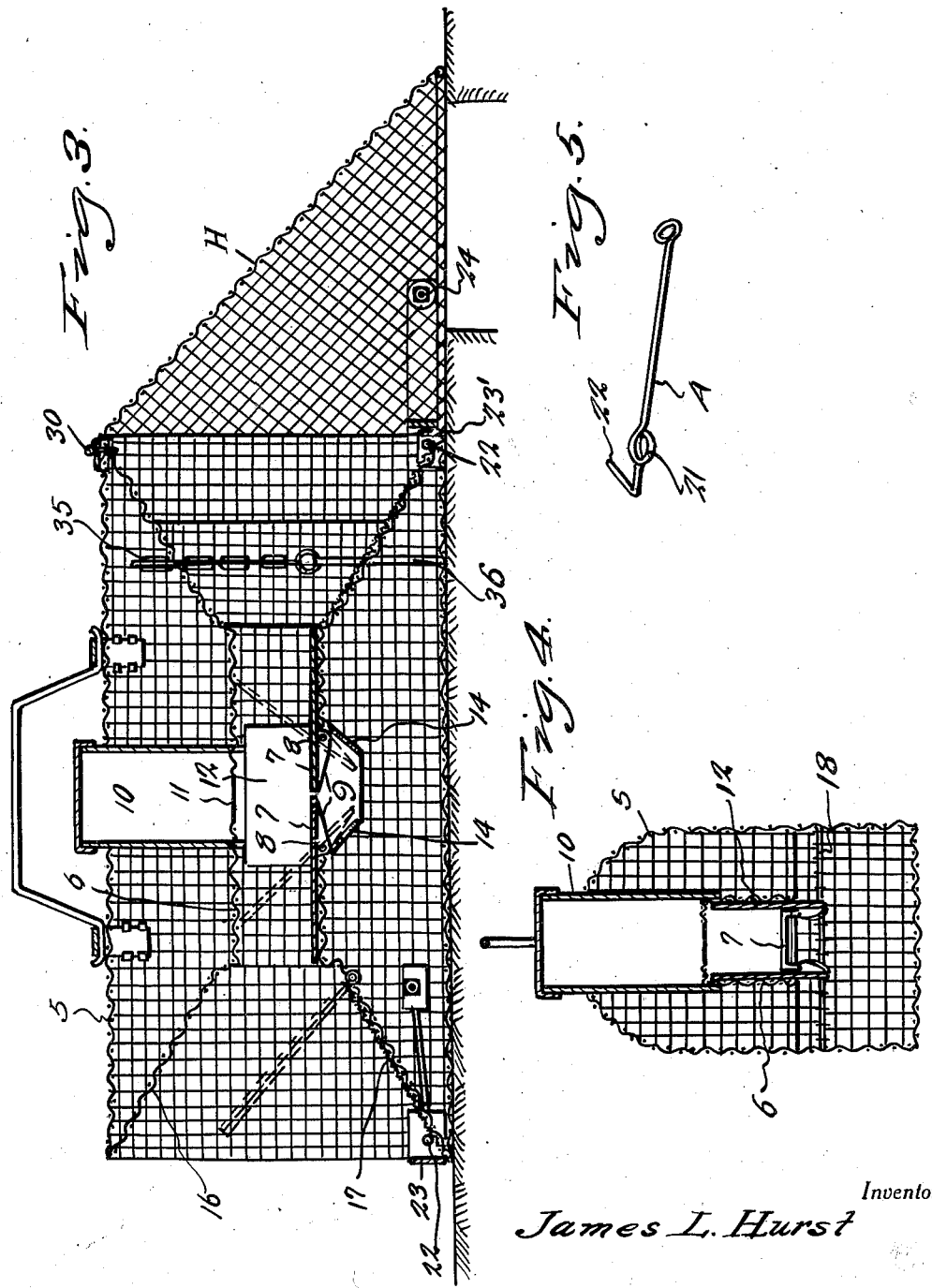
Inventor
James L. Hurst Patented Nov. 3, 1936

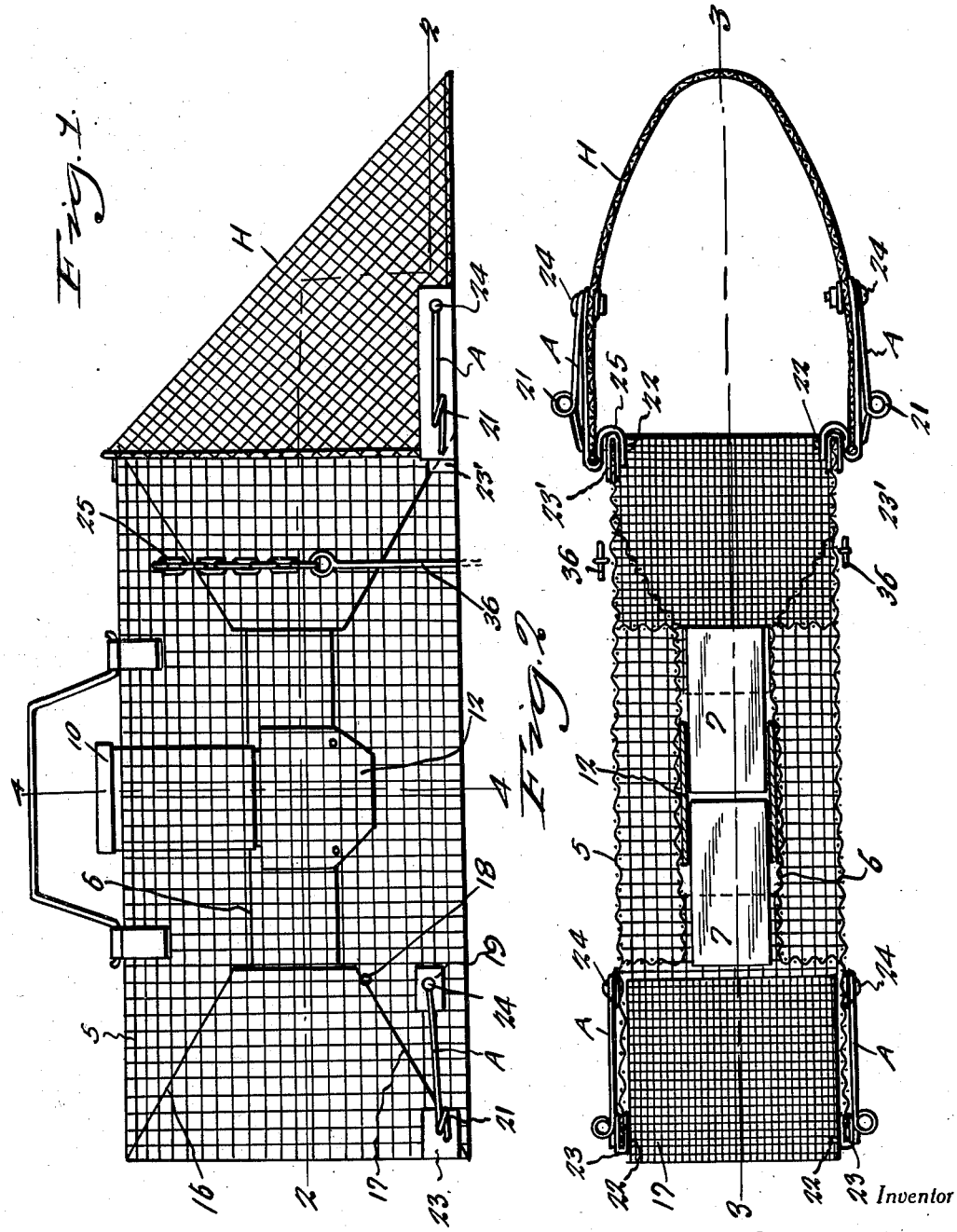

2,059,355

UNITED STATES PATENT OFFICE 2,059,355

ANIMAL TRAP

James L. Hurst, Spirit Lake, Iowa, assignor of one-half to B. E. Grottum, Jackson, Minn.

Application April 15, 1936, Serial No. 74,537

1 Claim. (Cl. 43—69)

The present invention relates to an animal trap and has for its prime object to provide an exceedingly simple construction for trapping animals.

Another important object of the invention lies in the provision of a trap with runways leading up to the trap entrances and means for hingedly mounting these runways and means for holding the runways in locked positions, the runways being, when free, swingable to a position to permit the exit of the trapped animals.

A still further important object of the invention resides in the provision of a trap of this nature which is exceedingly simple in its construction, inexpensive to manufacture, very efficient and reliable in use, and otherwise well adapted to the purpose for which it is desired.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of a trap embodying the features of my invention.

Figure 2 is a vertical horizontal section taken therethrough substantially on the line 2—2 of Figure 1.

Figure 3 is a vertical longitudinal section taken substantially on the line 3—3 of Figure 2.

Figure 4 is a vertical transverse section taken substantially on the line 4—4 of Figure 1.

Figure 5 is a detail perspective view of one of the fastening elements.

Referring to the drawings in detail it will be seen that the numeral 5 denotes an elongated casing of mesh material. A mesh passageway 6 is mounted in the central longitudinal intermediate portion of the casing 5 and the central portion of the bottom thereof is provided with an opening. Trap doors 7 are pivotally mounted as at 8 having webs 9 to receive the pivot pins. Numeral 10 denotes bait receptacle depending through the top of the casing 5 with the mesh bottom 11 and below the mesh bottom 11 being provided with spaced parallel co-extension side wings 12 the lower edges of which are provided with downwardly and inwardly inclined stop wings 14 engageable by the flanges 9 when the trap doors are tripped to the dotted line position shown in Figure 3. In the ends of the casing 5 are inwardly converging funnel entrance members 16 the inner ends of which merge into the passage 6. In the lower portions of these entrance funnels are treadway members 17 hingedly mounted as at 18 at their upper ends and swingable to the dotted line position shown in Figure 3. Members A, see Figure 5, are utilized in holding the treadways in down or locked position. At one end they are mounted hingedly in plates 19, have convolutes 21 intermediate their ends and pins 22 at their ends engageable through plates 23 over the lower or free ends of the runways 17. At the other end these members A are pivotally mounted as at 24 on hoods H and pins 22 are projectible through U-shaped members 25 and through plates 23'. This hood H is adapted to be disposed over an opening in the ground or any other animal opening such as a rat hole. The hood is hingedly engaged with the casing 5 as at 30. This trap may be used with or without the hood. The hood may be used at both or either end of the cage or casing 5. The animals, of course, enter through the funnels 16 into the passageway member 6 and drop down through the trap doors 7 into the bottom of the casing 5. They may be released by swinging the runway devices upwardly to the dotted line position shown to the left of Figure 3 by releasing the elements A. The trap may be anchored by suitable chain means 35 and ground anchors or pins 36.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

A trap of the class described comprising a casing, trapping means in the casing, said trapping means including trip means to deposit an animal in the bottom of the casing, a treadway leading up to the trapping means and being swingably mounted in forming a closure for the bottom of the casing, and means for releasably holding the treadway member in place, said means being in the form of spring members on the casing and having pins engageable through the casing and above the free or lower ends of the treadway devices.

JAMES L. HURST.